June 28, 1938.  W. L. MORRISON  2,121,815
AUTOMOBILE
Filed Dec. 7, 1933  4 Sheets-Sheet 1

Inventor:
Willard L. Morrison
By Parker & Carter Attys.

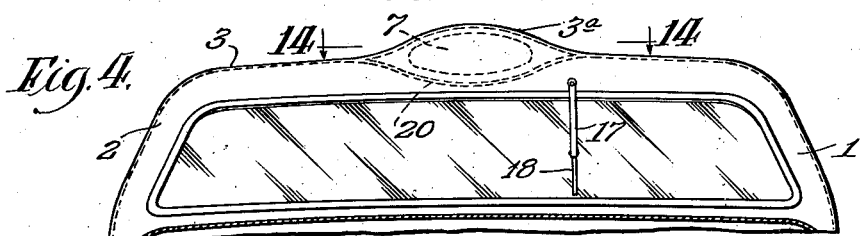
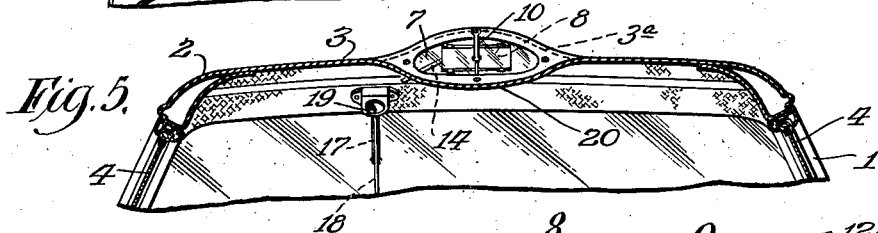
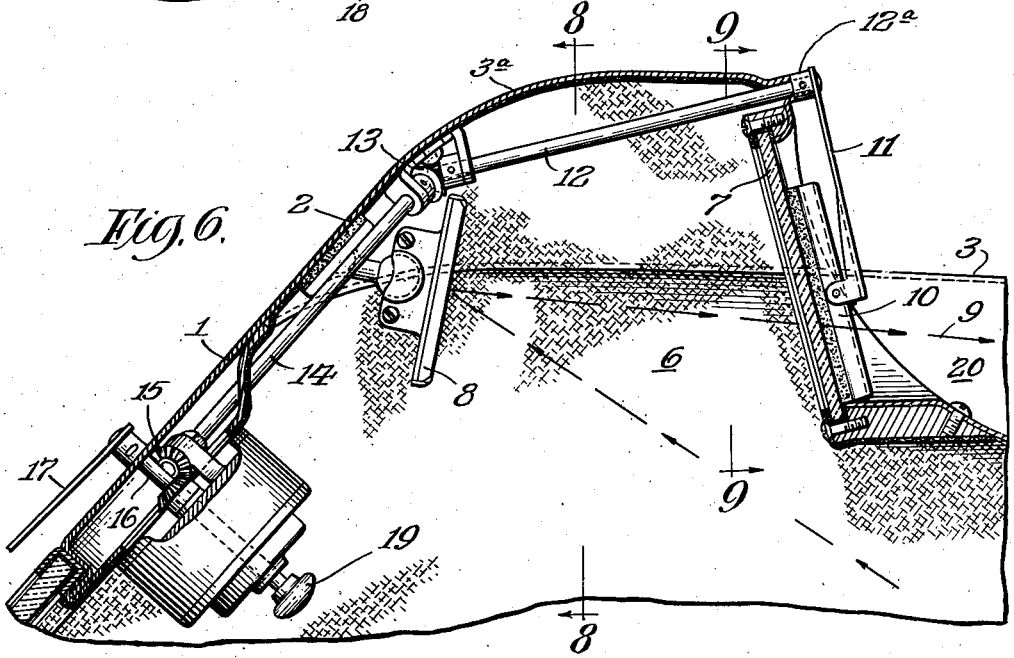
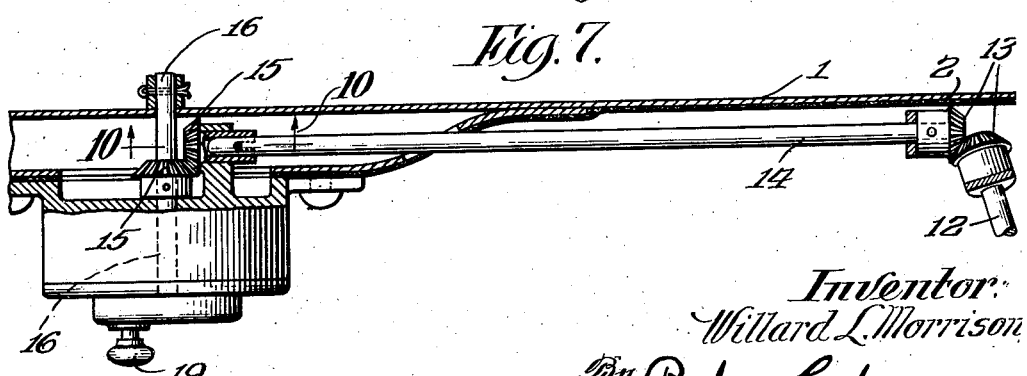

June 28, 1938. W. L. MORRISON 2,121,815
AUTOMOBILE
Filed Dec. 7, 1933 4 Sheets-Sheet 3

Inventor:
Willard L. Morrison,
By Parker & Carter
Attys.

June 28, 1938.  W. L. MORRISON  2,121,815
AUTOMOBILE
Filed Dec. 7, 1933  4 Sheets-Sheet 4

Inventor:
Willard L. Morrison,
By Parker & Carter Attys.

Patented June 28, 1938

2,121,815

UNITED STATES PATENT OFFICE 2,121,815

AUTOMOBILE

Willard L. Morrison, Lake Forest, Ill.

Application December 7, 1933, Serial No. 701,351

10 Claims. (Cl. 296—1)

This invention relates to improvements in automobiles and has for its object to provide a new and improved device of this description. The invention has as a further object to provide means for permitting an occupant of the automobile to have a rear view where the rear window is so located or positioned as to interfere with a rear view therethrough.

In certain cases where, for example, the roof of the automobile inclines downwardly and rearwardly, the view of the driver to the rear is shut off so that the ordinary rear view mirror, as now used, does not give this rear view. The invention has as a further object to provide means whereby an occupant of the automobile, by means of a suitable reflecting device, can have a rear view with the line of sight extending along but above the roof. The invention has further objects which are more particularly pointed out in the accompanying description.

Referring now to the drawings, Fig. 1 is a side elevation of one form of device embodying the invention;

Fig. 4 is a sectional view taken on line 4—4 of Fig. 1;

Fig. 5 is a sectional view taken on line 5—5 of Fig. 1;

Fig. 6 is an enlarged sectional view of the upper left hand portion of Fig. 3;

Fig. 7 is a sectional view taken on line 7—7 of Fig. 8;

Like numerals refer to like parts throughout the several figures.

Figure 1:
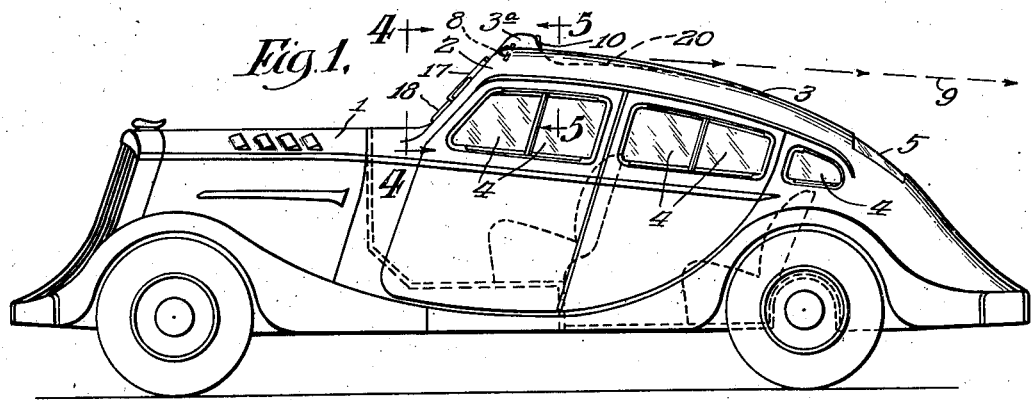

I have illustrated in the drawings an automobile 1 having a body 2 with a roof 3 which extends rearwardly and downwardly from the front of the body. The body has the side windows 4 and the rear window 5. In the construction illustrated the driver, by means of the ordinary mirror, cannot get a back view through this rear window. The present construction remedies this defect and provides means where the driver can secure this proper rear view. For this purpose the roof of the car has an opening 6 projecting above the roof portion 3 extending through a raised portion 3a. This opening may be left open, but is preferably provided with a window 7. A mirror 8 is mounted in proper relation to the opening 6 of the window 7, as shown for example in Fig. 6, being in proper position to be observed by the occupants of the automobile body, and preferably having a universal adjustment.

It will be noted that in this construction the line of sight 9 of the object at the rear of the automobile extends along the top of the roof above the roof through the window 6 so as to strike the mirror 8.

When a glass 7 is used in the opening 6, some means is preferably provided for easily and quickly cleaning it so as to keep it clear of water, snow, dirt or other foreign matter. There is illustrated one means for doing this, which consists of a cleaner or wiper 10 connected with an arm 11 on a shaft 12, the end of which projects through a bearing 12a to the outside of the glass 7. This shaft is connected by gears 13 with a shaft 14. The shaft 14 is connected by suitable gears 15 with the shaft 16 which moves the arm 17 of the wind shield wiper 18. The wiper may be operated in any of the usual ways through an engine or any other way, and if these get out of order it may be set in motion by the knob 19.

Figure 2:
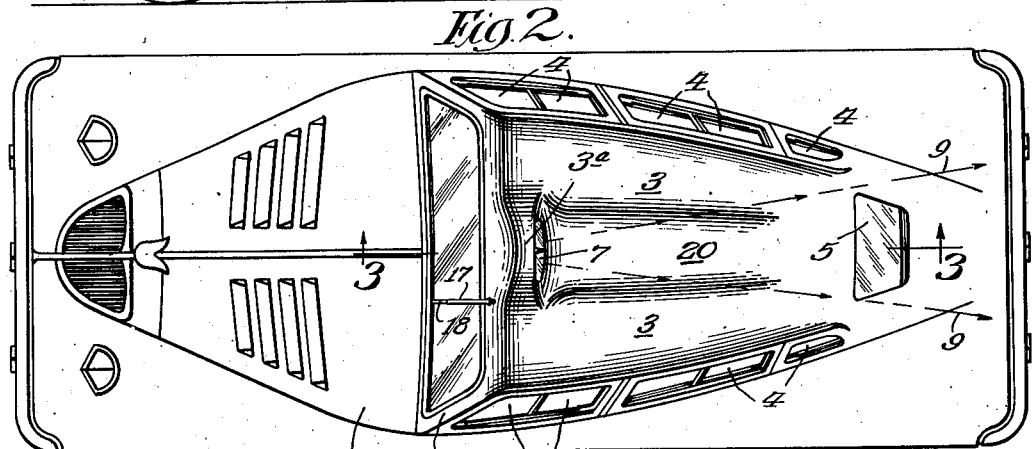
Fig. 2 is a plan view of the device illustrated in Fig. 1.
Figure 3:
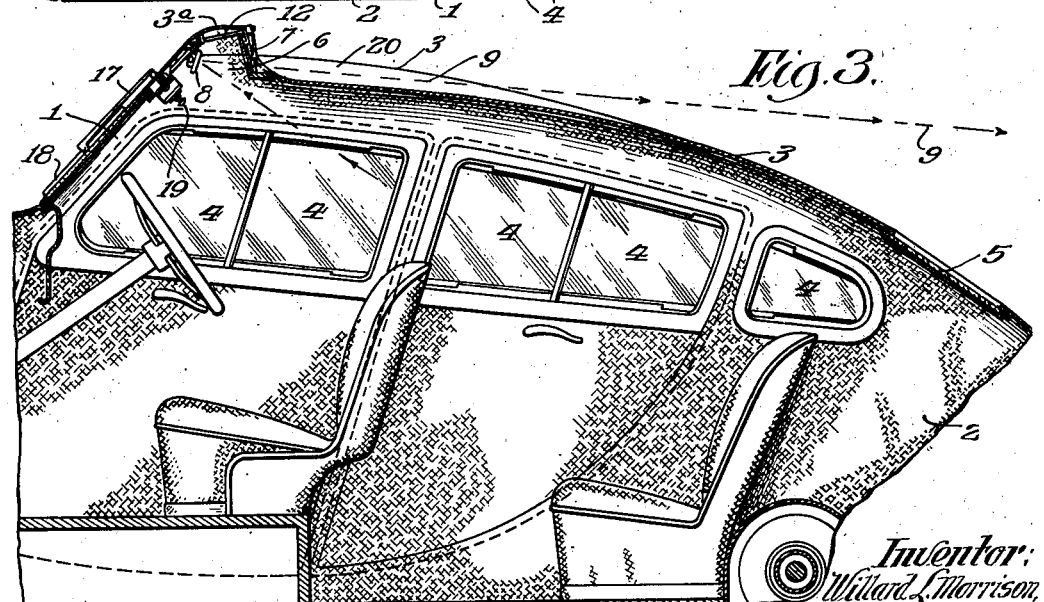
Fig. 3 is an enlarged sectional view taken on line 3—3 of Fig. 2.
Figure 8:
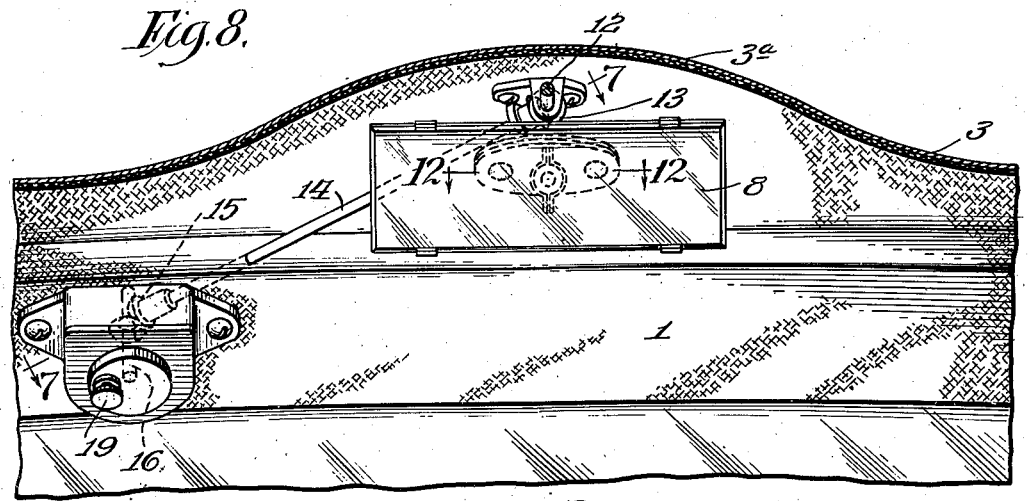
Fig. 8 is a sectional view taken on line 8—8 of Fig. 6.
Figure 9:
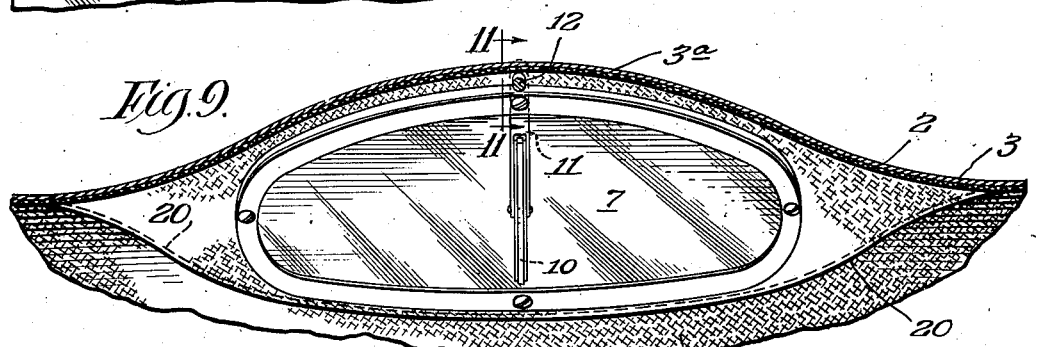
Fig. 9 is a sectional view taken on line 9—9 of Fig. 6.
Figure 10:
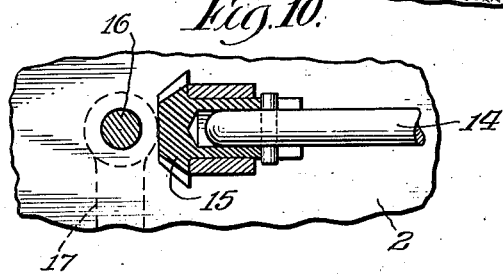
Fig. 10 is a sectional view taken on line 10—10 of Fig. 7.
Figure 11:
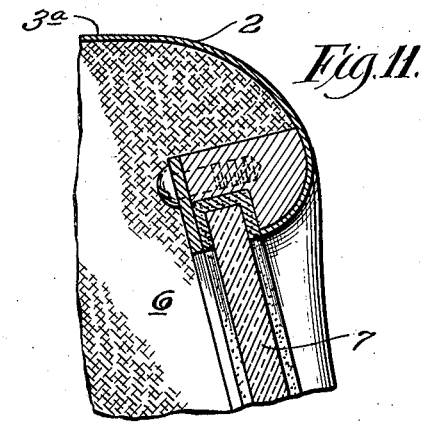
Fig. 11 is a sectional view taken on line 11—11 of Fig. 9.
Figure 12:
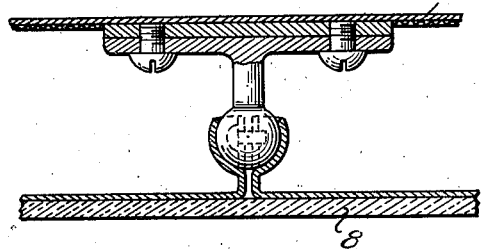
Fig. 12 is a sectional view taken on line 12—12 of Fig. 8.
Figure 13:
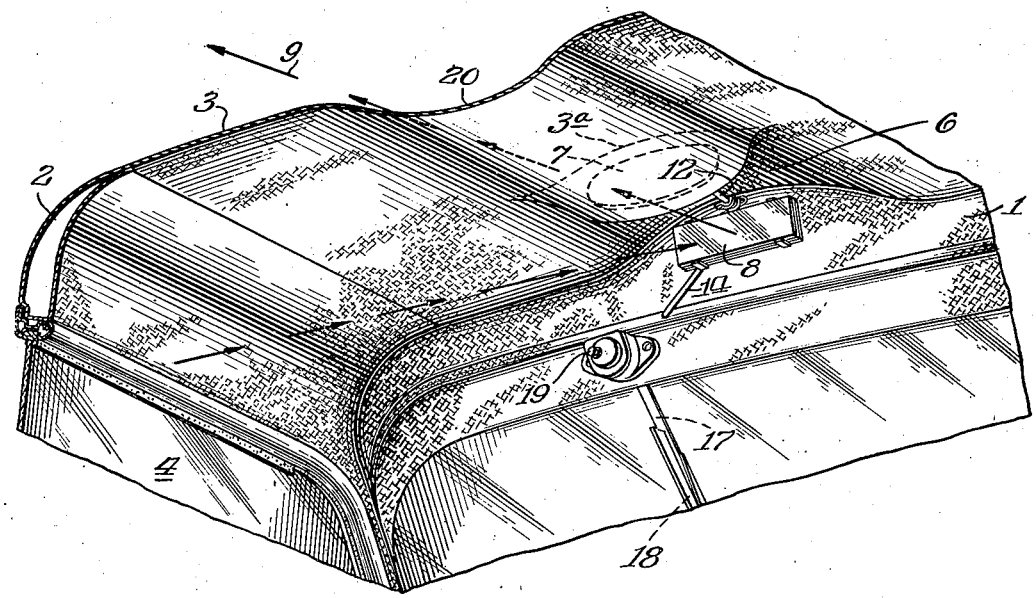
Fig. 13 is a perspective view of the front part of the roof of the automobile.
Figure 14:
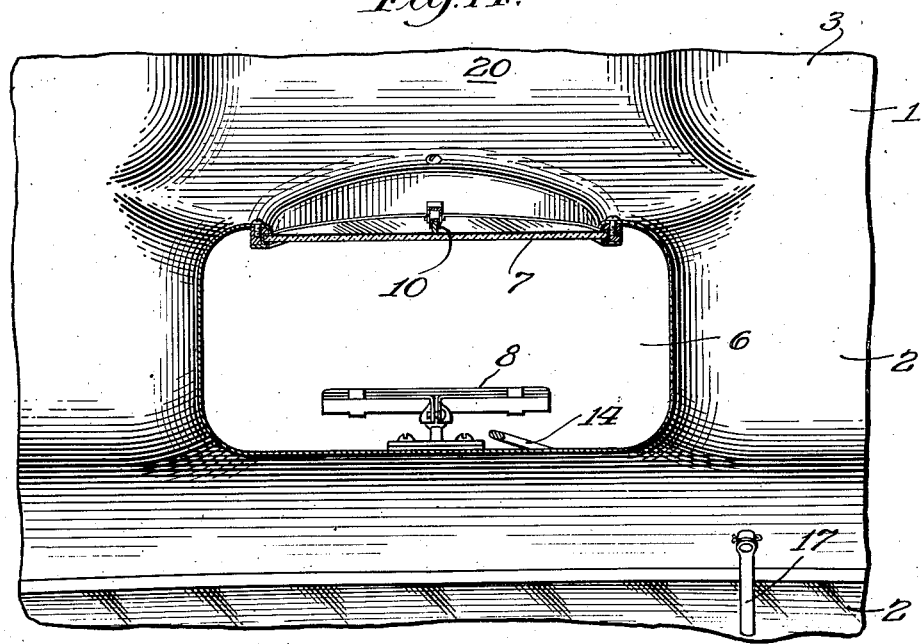
Fig. 14 is an enlarged sectional view taken on line 14—14 of Fig. 4.

In the particular construction illustrated the raised portion 3a may be made comparatively small by providing a depression 20 in the top, as shown for example in full lines in Fig. 2 and in dotted lines in Figs. 1 and 3. This permits a proper widening of the window without having the raised part 3a project to a height which might be objectionable.

In the operation of the device the mirror 8 is preferably adjusted and the line of sight to the objects in the rear extends from such objects along the top of the automobile and through the window 6, striking the mirror 8, and the driver or other occupant views what is in the rear by looking into the mirror. The mirror may be adjusted to secure the results desired.

The raised portion 3a forms, as it were a cupola and although the mirror may be above the portion of the roof opposite it, it is yet in a position where the driver can reach up his hand into the cupola to adjust the mirror. It will further be noted that the mirror is in close proximity to the glass 7 of the window and this gives a much wider range of vision than where the driver must look through the rear window, which is a long distance from the mirror. In other words, the angle of vision of the driver to the rear is very greatly increased or widened due to this proximity of the mirror and the window in the cupola. It will further be noted that since the window is up on the roof and near the front, no mud or dirt can be thrown up on this window so as to obscure the vision, as is the case in connection with the ordinary rear window. It will further be noted that this rear vision glass or window is in front of the driver, as is clearly shown in Fig. 3. Furthermore, in view of the position of the mirror above the head of the driver, this mirror is above the direct headlight range of the automobile behind, and therefore the glare of these headlights is eliminated. Furthermore, in view of the position of the mirror and the rear view window at the top or above the roof, the driver can see back of an automobile which may be closely following the one he is driving, being able to see a long distance back, equaling several blocks.

I claim:

1. An automobile comprising a body, a top inclined rearwardly and downwardly, an opening near the front of the top at a point forward of the back of the front seat, having a transparent member extending in an up and down direction and having its lower boundary approximately at the level of the body top and opening rearwardly above the portion of the top to the rear of it forming a rear view and a single adjustable rear view mirror located within the interior of the body and in front of said opening and which receives directly the image which the driver observes, the mirror and transparent member having portions in the same horizontal plane.

2. An automobile comprising a body, a top inclined rearwardly and downwardly, an opening near the front of the top at a point forward of the back of the front seat, having a transparent member extending in an up and down direction and having its lower boundary approximately at the level of the body top and opening rearwardly above the portion of the top to the rear of it, a single adjustable rear view mirror in front of said opening and which receives the image which the driver observes, the mirror and transparent member having portions in the same horizontal plane, and an enclosing device for the mirror formed in part by said transparent member.

3. An automobile comprising a body, a top, an opening near the front of the top at a point forward of the back of the front seat, having a transparent member extending in an up and down direction and having its lower boundary approximately at the level of the body top and opening rearwardly above the portion of the top to the rear of it for securing a rear view, a single adjustable rear view mirror located within the interior of the body and in front of said opening and which receives directly the image which the driver observes, the mirror and transparent member having portions in the same horizontal plane, the mirror and transparent member being located above the point where the eye of the driver is located.

4. An automobile comprising a body, a top, an upwardly projecting part near the front end of the roof and providing a recess in front of and above the driver, opening into the body of the automobile, a single rear view mirror in said recess upon which the image observed by the driver of what is at the rear is directly received, an opening in the rear of the upwardly projecting part facing toward the rear of the automobile to permit a direct rear view.

5. An automobile comprising a body, a top inclined rearwardly and downwardly, an upwardly projecting part near the front end of the roof having an interior space communicating with the interior of the body, an opening in the rear of the upwardly projecting part facing toward the rear of the automobile, a single rear view mirror in front of said opening, upon which the image seen by the driver is received, a portion of the roof back of said opening provided with a depression extending rearwardly from said opening so that the rear vision is obtained over the roof by means of the usual single rear view mirror.

6. An automobile comprising a body having a roof, an upwardly projecting part forming a portion of the front end of the roof and providing a recess at the front of the automobile, opening into the body of the automobile, and a single rear view mirror adjustably mounted in said recess and means at the rear of the recess for directing light upon said mirror, so that objects at the rear are directly received thereon and observed by the driver.

7. An automobile comprising a body, a cupola at the top of said body and open at the bottom, a rear view window in said cupola, and a single rear view mirror in said cupola in the direct line of vision of the occupant and in close proximity to said rear view window which directly receives the image of objects rearward of the automobile, whereby the angle of rear vision of the driver is greatly increased.

8. An automobile comprising a body, a cupola at the top of said body and open at the bottom, a rear view window in said cupola, and a single rear view mirror in said cupola in the direct line of vision of the occupant and in close proximity to said rear view window which directly receives the image of objects rearward of the automobile, whereby the angle of rear vision of the driver is greatly increased, said mirror and rear view window being in front of and above the driver.

9. A rear view device for automobiles comprising a single rear view mirror located within the interior of the body, a rear vision window located as a unit above the roof of the automobile and in a position forward of and easily seen and reached by the driver, said view obtained from under the lower edge of the rear vision window and back through said window by means of the single rear view mirror, said rearward window being close to said single rear view mirror to effect a wide angle vision of the view behind the automobile, said view being over the roof of the automobile.

10. A rear view device for automobiles comprising a rearward glazed window opening positioned at the highest point in the roof of the automobile forward of the driver's seat and within easy reach of the driver, a single rear view adjustable mirror located within the interior of the body forward of said glazed window opening and within easy reach of the driver, so that the driver can see rearward over the roof of the automobile by looking forward and upward into the single rear view mirror.

WILLARD L. MORRISON.